United States Patent Office 3,024,209
Patented Mar. 6, 1962

3,024,209
POLYURETHANE FOAM CONTAINING INORGANIC PIGMENT COATED WITH POLYMERIC MATERIAL
Thomas H. Ferrigno, Metuchen, N.J., assignor to Minerals & Chemicals Philipp Corporation, a corporation of Maryland
No Drawing. Filed May 27, 1959, Ser. No. 816,042
14 Claims. (Cl. 260—2.5)

The present invention relates to the class of polyurethane cellular plastics characterized by an open or intercommunicating cell structure.

One of the most outstanding advances in the plastics industry during the past decade has been the development of polyurethane foams which are cellular plastic materials formed by the reaction of long chain polyol compounds and organic polyisocyanates. Cellular plastics are available in various degrees of rigidity, ranging from soft, flexible foams useful in cushioning, clothing interliners, rug underlays, sponges and bath mats; semirigid foams, useful particularly as crash pads; and rigid foams for structural and insulation purposes. The final properties of the urethane foams depend principally on the choice of polyester, polyethers or other long chain polyhydroxyl compound which is converted by the polyisocyanate into a high molecular weight polymer which is then foamed by a suitable foaming system, usually by reaction of water with the free isocyanato content of the polymer, resulting in the formation of carbon dioxide which expands the resin into the desired cellular plastic. The control of branching in the reactants permits an extremely wide range of properties in the final foamed plastic. The density of the foam is controlled to a great extent by the amount of water employed. The configuration of the cell depends principally on the equivalent weight of the long chain polyhydroxyl reactant, with the lower equivalent weight polyhydroxyl materials favoring the production of a closed cell structure and the higher equivalent weight polyhydroxyl materials leading to the open cell structure. The degree of branching of the polyhydroxyl reactant also influences the cell character.

The flexible and semirigid foams are processed for the aforementioned applications in a manner such that the foam has a low density, usually from about 1.25 to 4 pounds per cubic foot, and preferably as low a density as is consistent with the provision of a product of adequate strength, etc. Moreover, such flexible and semirigid foams should have an open celled structure for most applications, which is to say that essentially all (i.e., at least about 90 percent), of the cells are intercommunicating since such a foam configuration is essential to the realization of acceptable foams for cushioning, clothing interliners, crash pads or the like. Rigid foams, in contradistinction, may have varying density values ranging up to 30 pounds per cubic foot or higher, and usually have a closed cell structure.

Many advances have been made in the field of polyurethane chemistry with a view to improving processing techniques and the properties of the ultimate foamed product. Despite the refinements in processing and reduced cost of raw materials, a serious drawback to the use of polyurethane foams is their high cost which reflects particularly the expense of the polyisocyanate reactant. An obvious expedient for lowering the cost of polyurethane foamed products would be to extend the foam produced by a unit volume of prepolymer with low cost filler materials, such as are extensively used in other plastic applications. Such a filler, to truly extend the foam volume, should increase the volume of foam produced by foaming the prepolymer by at least that foam volume produced by foaming a volume of liquid prepolymer equivalent to the volume of extender used. At any rate, the ultimate foam density of the filled foam should be not much greater than that of the unfilled foam since foams are generally employed on a volume basis and increase in foam density increases the cost of foam required for a particular application. Moreover, the use of the filler should not adversely affect other physical properties, such, such as compression set, deflection, tear strength and cell structure.

The open cell flexible and semirigid foams are commercially prepared without fillers. Certain finely divided inorganic materials have been advocated for imparting special properties, such as shrink resistance, improved compression set and increased density to various types of polyurethane foams. However, in the case of the low density open celled polyurethane plastics, it has been found that fillers adversely affect density and cell structure when incorporated in the foamable polyurethane composition in appreciable quantity such as 10 percent by weight or more. For example, fine silica, viz., silica finer than 1 micron and particularly silica finer than 0.015 to 0.020 micron, is used in small quantities in the production of some low density polyurethane foam compositions for the purpose of improving the compression set or reducing shrinkage of the foamed product. However, greater quantities of such silica cannot be incorporated in the foam structure inasmuch as the resultant foam will be too dense and have poor texture. Similar effects are noticed when filler grades of other minerals are included in foamable polyurethane formulations. Thus, fine filler grades of kaolin clay markedly increase the density of the normally open celled low density polyurethane foam when incorporated therein in appreciable amount, usually causing nonuniformity in the cell structure and loss of mechanical strength; in many cases, use of such clay, as well as other filler, causes complete or partial collapse of the foam. Thus, such kaolin clay fails to function as a foam extender.

Accordingly, an object of the present invention is to provide open celled flexible and semirigid polyurethane foam compositions containing inorganic filler material which will overcome the aforementioned difficulties.

Another object of the invention is to provide open celled low density polyurethane foam compositions containing finely divided inorganic solids as a filler therefor, which compositions possess characteristics such as: reduced cost, as a result of an increase in foam volume provided by foaming a unit of polyurethane polymer; physical properties as good or better than the unfilled foam compositions; and excellent stability and compression characteristics.

These and further objects and features of my invention will be readily apparent from the description thereof which follows:

I have discovered, in connection with the provision of low density open celled polyurethane plastics that important results are realized by utilizing as the filler inorganic pigment particles coated with certain polymeric materials of a character hereafter set forth.

Briefly stated, my invention contemplates the use as a filler or extender for low density, open celled polyurethane foam of inorganic pigments, the particles of which are uniformly coated with a polymeric film of a water-soluble high polymer containing a substantially linear molecular chain and derived by polymerization of at least one monoolefinic compound through aliphatic unsaturation, said polymer being of a character such that a 1 percent aqueous solution thereof has a pH within the range of from about 4 to 9. The polyisocyanate-polyol reactants I employ are those that normally produce an open celled foam in the presence of a suitable foaming system. The coated pigment particles are added to a foamable polyisocyanate-polyol system prior to its foaming and are uniformly distributed throughout the finished cellular product. The physical appearance of the filled foam resembles that of the opened celled unfilled counterpart, although microscopic examination will show that the cell walls are thinner in the filled foam.

I have found that such coated pigments, in contradistinction to their uncoated counterparts, can be incorporated in relatively large quantities in the foamed composition without adversely affecting physical properties of the foamed plastic, particularly without increasing appreciably the foam density. In many instances the physical properties, such as compression set, of foams formulated with such coated fillers are superior to those of the unfilled foam. A principal advantage attendant the use of many of the coated fillers is that the volume of foam produced by a given weight of polyol-polyisocyanate reaction mixture is increased, usually by more than the volume occupied by an equivalent volume of foamed polyurethane-prepolymer in the absence of the coated pigment particles so that the pigment acts as a true extender and reduces the cost of a unit volume of foam.

Although I do not wish to be bound by any theory as to how the polymeric film on the pigment particle favorably affects the characteristics of the pigment in the polyurethane system, it would seem that the film precludes reaction with or adsorption of the isocyanate from the system inasmuch as isocyanates are potentially reactive and/or adsorbed by pigments. Pigments, by virtue of their extensive surface area, possess the potential for strong physical adsorption of isocyanates; certain pigments, such as clays, talcs, and zeolites are potentially chemically reactive with isocyanates through hydrogen bonding, the active part of the clay or the like presumably being silicate oxygen atoms and/or hydroxyl groups on the surface of the clay particles. At any rate, it is evident that when the various water-soluble polymers are coated on the pigment particle, the compatibility of the pigment with the polyurethane system is improved and less dense open celled foams may be formulated with the coated pigments than with the uncoated pigment.

My invention is applicable, generally, to hydrophilic or water-wettable inorganic pigments, natural and synthetic, and is particularly directed to pigments having a high surface area and possessing base-exchange capacity and/or proton acceptor sites, presumably silicate oxygen atoms and/or hydroxy groups on the surface. The latter class of pigments, sometimes described as base-exchange adsorbents, are most markedly improved by the surface modification in that in their normal hydrophilic condition they increase materially the foam density and often result in foam collapse when formulated in foamable polyurethane compositions. As examples of high surface base-exchange pigments, which are also proton acceptors, may be cited clays, natural and synthetic zeolites, talc, oxides and hydroxides of alkaline earth metals, silica, particularly silica xerogels and aerogels. Among the clays, I use nonswelling clays such as kaolinite, attapulgite and sub-bentonites. Swelling clays or so-called "expanding lattice clays" are flat, plate-like structures which expand appreciably in the presence of water to the extent of an increase of at least 25 Angstrom units in the c-axis spacing. Swelling clays, unlike kaolinite and attapulgite, for example, tend to impair the water resistance of foams formulated therewith. Other finely divided pigments which are benefited by surface treatment with the aforementioned polymeric coating agents include iron oxide, titania, limestone, dolomite and precipitated calcium carbonate. The surface treatment with polymers permits such pigments to be incorporated in the foam without the increase in the foam density normally incident to the use of the uncoated pigment counterpart.

The polymeric materials I employ to coat pigment particles, prior to adding such particles to a foamable liquid polyurethane prepolymer, are prepared by polymerization of at least one monoolefinic compound through aliphatic unsaturation and are characterized by having a substantially linear continuous carbon atom chain along which are distributed numerous side chains. The side chains may be of one or more types, and contain a sufficient proportion of hydrophilic groups so that the polymer is water soluble. As examples of suitable hydrophilic groupings in the side chain may be cited: amide, amine, ether, hydroxyl, acetal, amine salts of carboxylic acid and various combinations of the aforementioned.

A 1 percent aqueous solution of suitable homo and copolymers should have a pH within the range of 4 to 9 inasmuch as pigments coated with polymers which are more basic or acidic will have an adverse effect upon the polyurethane system. The homopolymers and copolymers I employ have a molecular weight of at least about 2,000 and, more usually, 50,000 to 100,000 or more.

The polymeric materials I employ to coat pigment particles are prepared by so-called "vinyl polymerization" which involves polymerization of at least one monoolefinic compound through aliphatic unsaturation in the presence of a suitable free radical or so-called "per" catalyst, as is well-known to those skilled in the art.

As noted above, the polymeric coating agents I employ are water soluble. As used herein, the term "water soluble" is intended to encompass those polymers which form apparently true homogeneous solutions or dispersions in water, cold or hot.

A preferred polymeric film-forming agent for the purposes of my invention is polyvinylpyrrolidone, which is represented by the formula:

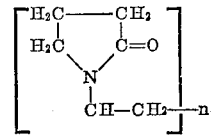

Polyvinylpyrrolidone is highly soluble in water and concentrated solutions have relatively low viscosity, so that pigments may be coated with polyvinylpyrrolidone without the necessity for removing large quantities of water in the drying of the pigment. Polyvinylpyrrolidone is commercially in grades having molecular weights of from 40,000 to 360,000.

One class of suitable polymeric coating materials is that of the polyvinyl alcohols which may be described by the structural formula:

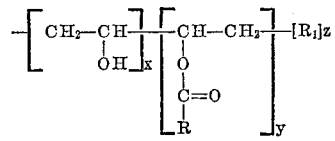

wherein R is a group selected from hydrogen and alkyl groups containing from 1 to 3 carbon atoms, $R_1$ is a group derived by polymerization of a monomer copolymerizable with vonyl esters, and $x+y+z=1$. $x$, $y$ and $z$ represent the relative proportion of vinyl alcohol, vinyl ester and copolymerizable monomer, respectively. $x$ is at least 0.5, $y$ is less than $x$ and $z$ varies from 0 to 0.2. This class of polymeric material is prepared by controlled hydrolysis of homopolymers of vinyl esters or copolymers of one or more vinyl esters with monoolefinically unsaturated compounds such as, for example, acrylonitrile, vinyl chloride, vinylidene chloride, isobutylene, vinyl ethers, etc. When the copolymerizable monomer is an acid such as acrylic acid, methacrylic acid, maleic acid, fumaric acid, etc., the carboxyl radical in the copolymer should be neutralized with an amine, rather than inorganic alkali, to bring the pH of an aqueous solution within the desired range since the presence of ions of inorganic alkali is to be avoided in the polyurethane system.

The acetal and partial acetal derivatives of the aforementioned polyvinyl alcohols are also useful, these being formed by reaction of polyvinyl alcohols with aliphatic aldehydes having 2 to 8 carbon atoms.

Another type of continuous carbon chain polymers are the homo and copolymers of amides of unsaturated carboxylic acids such as exemplified by homo and copolymers of acrylamide, methacrylamide, and mono- and di-N-substituted derivatives thereof.

Yet another type of suitable polymer is that of homo and copolymers of vinyl ethers, particularly alkyl vinyl ethers such as methyl and ethylvinyl ether. As in the case of copolymers of vinyl alcohol and unsaturated carboxylic acids, such as maleic acid, or anhydrides thereof, copolymers of vinyl ethers with unsaturated carboxylic acid should be neutralized with amines rather than inorganic alkali.

A class of suitable continuous carbon chain polymers which may be useful in coating pigment particles are those having recurring basic nitrogen-containing groups distributed along the continuous chain, such basic nitrogen-containing groups being present in amount sufficient to impart water solubility to the polymer. As examples of such basic nitrogen groups may be cited aminoalkyl, heterocyclic nitrogen groups. Representative of such polymers are polyvinyl pyridine, poly-N-vinylimines and poly-N-alkylamines and copolymers thereof with vinyl esters, vinyl chloride acrylonitrile, styrene, etc.; N-aminoalkyl amides, amine salts of aminoalkylacrylates and methacrylates. The aforementioned polymers may be used in amine form or, when their solubility is low, as in the case of vinylpyridine, as the acetate or mineral acid salts.

The pigment particles may be coated with the aforementioned polymers by any method which insures the uniform distribution of the polymer on the surface of the pigment particles. For example, the polymer may be blended with the pigment and the mixture hammer milled or ball milled. However, inasmuch as the effectiveness of the coating is related to its uniform distribution on the pigment, the pigment is preferably slurried with an aqueous solution of the polymer and the slurry dried.

Regardless of the method of preparation, the coated pigments should be in the form of fine particles, i.e., at least about 99 percent by weight of the particles are finer than 44 microns (325-mesh), or in other words, not more than 1 percent by weight is retained on a No. 325 U.S. Standard Sieve. Since products made by wet methods generally consist of aggregates, such aggregates should be broken up to provide the coated pigment particles in the desired pulverulent form.

The pigments should be substantially dry (less than about 1 percent free moisture) when added to a polyurethane prepolymer inasmuch as water carried by the pigment will react with free isocyanato groups in the system. The term "free moisture" (F.M.) is meant the weight percent of the pigment eliminated by heating the pigment essentially to constant weight at about 250° F.

The amount of polymer that is employed to coat the pigment is usually between about 1 percent and 30 percent, based on the pigment weight and is preferably that which will theoretically completely cover the surface of the pigment particle with a monomolecular layer; hence, the optimum quantity of coating agent relative to the pigment will depend on the surface area of the pigment. Thus, in the case of kaolin, which normally has a surface area between about 3 and 10 square meters per gram, about 1 percent of polymer, based on the dry pigment weight, will suffice although up to about 20 percent of coating agent may be employed. In the case of attapulgite, which has a surface area of about 200–220 square meters per gram, larger quantities of coating agent are indicated, e.g., about 5 to 30 percent, based on the dry clay weight. The surface area of a pigment may be determined by a nitrogen adsorption method described by S. Brunauer, P. H. Emmett and E. Teller in their article entitled "Adsorption of Gases in Multi-Molecular Layers," on page 309 of the Journal of the American Chemical Society, volume 60, February 1938, using the molecular size data of H. K. Livingston presented in his article entitled "Cross-Sectional Areas of Molecules Adsorbed on Solid Surfaces," on page 569, Journal of the American Chemical Society, volume 66, April 1944.

The amount of coated pigment to be used in the preparation of foamed plastic may vary over a relatively wide range depending principally on the viscosity of the foamable polyurethane prepolymer in which it is incorporated. In general, the coated pigment is used in an amount of from about 5 percent to about 40 percent by weight of the polyurethane prepolymer and is more usually used in an amount between about 7.5 percent and about 15 percent, same basis.

The foamable polyurethane prepolymer I employ is one that is normally a liquid and is preferably one that has as low a viscosity under ambient condition as is consistent with the provision of an ultimate foamed plastic of acceptable physical properties. The prepolymer contains free isocyanato groups in excess of that required to react with the hydroxyl groups of the polyol employed in the preparation of the prepolymer and with the water employed in the foaming step. The viscosity of the foamable liquid polyurethane prepolymer is between about 500 and 75,000 cp., although preferably the viscosity is between about 500 and 50,000 cp. I have found that prepolymers having a viscosity greater than about 75,000 cp. may not be filled with adequate quantities of the coated pigment to influence favorably the cost of the finished product whereas the physical properties of the ultimate foam may be impaired if the viscosity of the prepolymer is lower than about 500 cp. All viscosity values refer to determinations made at 25° C.

Suitable polyurethane polymers are the reaction products of long chain polyols and polyisocyanates, as exemplified by the reaction product of an arylene diisocyanate and a polyalkylene ether polyol, the reaction product of an arylene diisocyanate and a saturated polyester resin containing terminal hydroxyl groups, and the reaction product of an arylene diisocyanate and a fatty acid triglyceride having an hydroxyl number of at least 49. All of the aforementioned polyurethane prepolymers are well-known to those skilled in the art and their preparation is amply described in the literature. The preparation of the reaction products of arylene diisocyanates and polyalkylene ether polyols, which are particularly useful prepolymers in the practice of my invention because of their low viscosity is described in Technical Data 11058, National Aniline Division, Allied Chemical & Dye Corporation. Triglycerides having a hydroxyl number of at least 49, e.g., castor oil, may be reacted with arylene diisocyanates, as described in U.S. 2,787,601, to form a suitable liquid polyurethane prepolymer. The ratio of triglyceride hydroxyl groups to isocyanato groups in such polyurethane products is from 0.45:2 to 0.95:2. Other liquid polyurethane compositions containing free isocyanato groups and which produce a plastic foam upon reaction with water may be used.

The particular long chain polyol that is used in the foam preparation is one that normally reacts with the polyisocyanate to produce an essentially linear reaction product which, in the presence of a catalyst, is capable of being foamed to provide an open celled low density cellular polyurethane product. In general, it may be said that suitable liquid long chain polyols have an equivalent weight of at least 200. The term "equivalent weight" as used herein is synonymous with the term "isocyanate equivalent" and is a theoretical value calculated from the hydroxyl and acid values of a polyol according to the formula:

$$\text{Equivalent weight} = \frac{56{,}100}{\text{Hydroxyl value} + \text{acid value}}$$

A preferred class of polyol, because of its low cost and low viscosity characteristics, is that of the so-called "polyethers" which are polyalkylene ether polyols, the reaction products of alkylene diamines, such as ethylene diamine, or polyhydroxyl compounds such as glycerine, with alkylene ethers such as ethylene oxides, propylene oxide or mixtures of propylene oxide and ethylene oxide. Such polyethers have a functionality of at least 2 and an equivalent weight of at least 200, and typically between 865 and 1333. As examples of suitable commercial polyethers may be cited: "Tetronic 701," a product of Wyandotte Chemical Company, which is a condensation product of ethylene diamine and mixed propylene and ethylene oxides, having a functionality of 4 and an equivalent weight of 865; Pluronic L-61, also a product of Wyandotte Chemical Company, which is prepared from propylene glycol and mixed propylene and ethylene oxides and has a functionality of 2 and an equivalent weight of 1,000; the polyglycol ether from glycerine and propylene oxide having a functionality of 3 and an equivalent weight of 1333, supplied under the trade designation "11-300" by The Dow Chemical Company, which is a polypropylene ether glycol from propylene oxide, having the functionality and equivalent weight of Pluronic L-61. Although I prefer to employ polyethers because the low viscosity of polyether-polyisocyanate adducts is conducive to the realization of celled urethane foams extended with relatively large quantities of coated inorganic filler material, other polyols may be used, particularly those which have a relatively low degree of branching, equivalent weights usually at least about 200, and are otherwise adapted to produce an open celled foam.

Another class of suitable polyhydroxyl compounds that may be used is that of saturated polyesters having terminal hydroxyl groups and low acid numbers (usually below 15); these polyesters are made from a dibasic acid, such as adipic acid, or succinic acid and a dihydric alcohol, such as ethylene glycol, or mixtures thereof. The resultant polyesters are liquids of moderate molecular weight, e.g., 1000 to 2500, terminate in hydroxyl groups and function chemically more or less as high molecular weight polyfunctional alcohols inasmuch as they have low acid numbers and are essentially free from the highly branched, viscous or solid polyesters derived essentially from triols and having low equivalent weights and used in producing rigid, closed celled foams. In addition to polyesters having terminal hydroxyl groups, fatty acid triglycerides having a hydroxyl number of at least 49, e.g., castor oil and derivatives thereof, may be employed as described in U.S. Patent No. 2,787,601. Also useful are dihydroxy triglycerides, which have a lower functionality than the parent triglyceride and a higher equivalent weight, typically about 500-600. The triglycerides, particularly the trihydroxy triglycerides, are usually used in conjunction with the aforementioned polyethers or polyols having a molecular weight below 200, as exemplified by ethylene glycol, trimethylolpropane and polyethyleneglycol. Polyols other than those specifically set forth above may be used provided that they normally are capable of forming an open celled foam with the polyisocyanate.

A large number of polyisocyanates may be used in the preparation of the cellular urethane products, although preferably the aromatic polyisocyanates, which are more reactive and less toxic than aliphatic polyisocyanates are used. At present 2,4-tolylene diisocyanate, 2,6-tolylene diisocyanate and mixtures thereof, are commercially available. However, other diisocyanates may be used with good resutls when they are available, as examples of which may be cited methylene-bis-(4-phenyl isocyanate), naphthalene 1,5-diisocyanate, and 3,3'-dimethoxy-4,4'-biphenylene diisocyanate.

As is well-known to those skilled in the art, the isocyanate is employed in excess of that required to react with all functional groups in the polyol (and to react completely with water, when an aqueous foaming system is employed).

The isocyanate content of the prepolymer is controlled so as to provide more —NCO groups that theoretically required for complete reaction with all water and all functional groups in the polyol. The free —NCO content of the prepolymer is about 5 percent to 20 percent, based on the weight of the prepolymer and is usually about 9 percent. The excess isocyanato groups, which are at the end of the polyurethane chains after the water added to the prepolymer is consumed, can then react with active hydrogen groups, such as urea, urethane, hydroxyl or amide groups within the polymer chain so as to branch linear chains or cross-link branched chains in order that optimum physical properties of the foam may be developed.

The number of free or unreacted isocyanato groups in the polyurethane prepolymer may be determined by adding an excess of n-butylamine and back-titrating excess amine with hydrochloric acid.

The amount of water added to the polyurethane prepolymer containing unreacted isocyanato groups to expand the polymer into a cellular plastic will vary with the properties sought in the foamed plastic and is usually within the range of from about 33⅓ percent to about 95 percent of the unreacted isocyanato radicals in the polyurethane prepolymer.

Other materials may be added during the formation of the plastic foam from the polyurethane prepolymer to control, for example, the reaction rate and viscosity build-up during reaction. A tertiary amine catalyst, such as for example, pyridine, triethylene diamine, dimethylhexadecylamine, quinoline, triethylamine or N-methylmorpholine, is employed to accelerate the reaction between the water and isocyanate groups of the prepolymer, as well as to induce crosslinking by reaction of excess isocyanato groups with substituents of the polyurethane. However, other catalyst systems may be employed within the scope of my invention. For example, I may use a combination of a tertiary amine with an organic tin product, such as dibutyl tin dilaurate, dibutyl tin oxide. The tin organic have also been found to be effective in the absence of tertiary amine catalysts.

It will be distinctly understood that modifications of the so-called "prepolymer method" may be employed in the preparation of the kaolin clay extended open celled foams. All of these methods involve the reaction of an arylene diisocyanate with a long chain linear polyol to form a foamable polyurethane which contains unreacted —NCO groups, and foaming the arylene diisocyanate-polyol adduct in the presence of a catalyst. For example, the isocyanate may be reacted with a portion only of the polyol to provide a polymer having a relatively high —NCO content, e.g., about 30 percent; the polymer coated filler may be added thereto followed by addition of a mixture of remaining polyol, catalyst, water and surface active agent. In such a case, the total quantity of polyol will be such as to provide about a 9 percent free isocyanato content in the mixture. Likewise, other foaming systems may be employed. For example, a metal salt hydrate may be employed in lieu of or in conjunction with water. Also, a solvent foaming system, a recent innovation in the polyurethane foam art, may be used. Pursuant to the latter, the polyurethane prepolymer is dissolved in a solvent, the solvent being one which has a boiling point just above room temperature at atmospheric pressure. Catalyst is added and the heat of reaction causes the solvent to vaporize and, as the polymeric structure builds up, the solvent volatilizes, thereby foaming the polymer. A smaller quantity of polyisocyanate is employed in the production of such a composition than when water is employed in the foaming step.

Various other materials may be included in the foam composition of my invention, as examples of which may be cited external plasticizers, such as diesters, used to impart flexibility, coloring agents, emulsifiers and surface active agents. The latter class of materials encompass compounds of a wide variety of ionic character, surface activity, etc. It is well-known that the cell size, water resistance, resistance to discoloration and chemicals, compression set, etc., may be controlled to a certain extent by the type and concentration of surfactant.

Following is an example which illustrates the superiority of various polymer coated pigments over their uncoated counterparts as fillers in polyurethane foams. It will be clearly understood that the invention is not limited to the particular prepolymer, fillers and quantities mentioned in these examples, in which all parts are by weight.

(1) PREPARATION OF POLYURETHANE PREPOLYMER

In this example the polyol employed in preparing the polyurethane prepolymer was Niax Diol PPG–2025, a product of Union Carbide Chemicals Company, Division of Union Carbide Corporation, which is a linear polypropylene oxide glycol having a molecular weight of 2000 and an hydroxyl number of 56.

2200 parts of the polyether was mixed thoroughly and rapidly with 200.2 parts of 2,4-tolylene diisocyanate (1.05 equivalents per equivalent of polyether) under a dry nitrogen blanket in a stainless steel vessel, resulting in an exothermic reaction. The temperature increased to 158° F. after one hour and was maintained at this temperature for about 2¾ hours at which time viscosity was 1500 cp. (as measured at 25° C. on a Brookfield viscometer using the #5 spindle). 539 parts of 2,4-tolylene diisocyanate was added to bring the final —NCO content of the prepolymer to 9 percent over a period of about an hour, holding the temperature at about 158° C. The batch was then poured in cans which were flushed with dry nitrogen gas and sealed. The prepolymer had a density of about 8.75 pounds per gallon.

(2) PREPARATION OF COATED FILLERS

Aqueous polymer solutions were added to attapulgite clay in amount to provide 5 parts by weight of polymer to 100 parts by weight of colloidal grit-free grade of attapulgite clay, on a dry clay basis. The filler was mixed in the polymer solution, the mixture dried to a free moisture content of less than 1.0 percent and ground to —325-mesh.

(3) PREPARATION OF FOAMS

The prepolymer was mixed with polydimethyl siloxane liquid (a wetting agent supplied by Dow Corning Corporation under the designation DC 200), using 100 parts of prepolymer to 0.5 part siloxane. Various fillers, including polymer coated attapulgite clay, were added to fractions of the prepolymer, using 10 parts of filler for each 100 parts of prepolymer, and mixed into the prepolymer for three minutes under high speed agitation.

To each fraction containing 10 parts filler, 100 parts prepolymer and 0.5 part siloxane, a mixture of 2.0 parts N-methylmorpholine and 2.3 parts water was rapidly added and the batch agitated vigorously for 10 seconds and then immediately poured into a closed mold lined with polyethylene film. 15 minutes after the foams reached peak height, the foam and form were placed in a forced draft oven at 158° C. for 15 minutes and the forms removed. All foams were post cured for four hours at 176° F.

In Table I there is recorded the physical properties of the foamed resins formulated as above-described with the various filler above.

Densities were determined by weighing blocks carefully cut to 2 x 2 x 1 inch. These blocks were then used in the 50 percent deflection and percent compression set tests. The compression set test was conducted in accordance with ASTM test D-1564-58, method B, constant deflection. This value represents the percent of the original height of the sample which did not recover in 30 minutes after the sample had been compressed to half its original height for a period of 22 hours at 158° F. The higher values indicate poor resiliency characteristics or loss of resiliency upon aging. The 50 percent deflection test was conducted by loading a balanced board and tin can on the 2 x 2 x 1 inch specimen and filling the can with bird shot until the one-inch dimension was reduced to ½-inch and remained at this height for one minute. The total load was determined and reported as pounds per square inch per 50 percent deflection.

The data representing foam volume in cubic feet was derived by dividing the total batch weight, in pounds, including that of the extender, by the density of the cured foam. If an increase of foam volume was realized, the effect was due to the extender. As mentioned, a filler to be truly an extender for a foamed resin must increase the total foam volume developed from a given volume of liquid prepolymer by an amount at least equal to the volume of foam developed by a volume of liquid prepolymer equivalent to the volume of the filler itself in the foam. Thus, for example, if 100 pounds of an unfilled prepolymer weighing 8.75 pounds per gallon yields 2.59 cubic feet of foam per gallon of prepolymer (or 100 pounds of prepolymer yields a total foam volume of 30.4 cubic feet), then addition of 10 pounds of a mineral filler occupying about 0.465 gallon should increase the foam yielded by 100 pounds of the same prepolymer by 2.59×0.465 or about 1.20 cubic feet.

*Table I*

PHYSICAL PROPERTIES OF FLEXIBLE FOAMS

| Filler | Coating | Foam density lbs./cu.ft. | Total vol. of foam | P.s.i./ 50% deflection | Percent compression set |
|---|---|---|---|---|---|
| None (control) | | 3.29 | 30.4 | 0.50 | 29.5 |
| Attapulgite [1] | | 3.87 | 28.4 | 0.41 | 11.5 |
| Do | Polyvinylpyrrolidone, 5%. | 3.24 | 34.0 | 0.51 | 24.5 |
| Do | Polyacrylamide, 5%. | 3.23 | 34.0 | 0.53 | 18.5 |

[1] Attagel 20, a grit-free grade of attapulgite, dried at 225° F. to a free moisture content of 2%.

The data reported in Table I shows that the attapulgite, uncoated, was unsuitable as a filler for the polyurethane foam in that it actually decreased the foam volume produced by the prepolymer from what it would be in the absence of the clay. In contrast, the same quantity of polymer coated attapulgite increased the volume of foam produced by substantially more than the same volume of liquid prepolymer would have increased the foam volume. Moreover, the compression set of the foam formulated with polymer coated attapulgites was improved over that of the unfilled foam, indicating improved foam resilience. The polymer coated clay had no marked effect on the rigidity of the foam.

Similar improvement in foam volume will be expected when other hydrophilic, inorganic finely divided fillers, such as other nonswelling clays, as well as oxide, silicate and carbonate fillers hereinabove set forth are used in lieu of the attapulgite.

I claim:

1. An essentially open celled plastic foam composition comprising the water-foamed polymerization product of a liquid polyurethane prepolymer having free —NCO groups, said prepolymer being the reaction product of an arylene diisocyanate and at least one liquid polyol selected from the group consisting of a liquid long chain linear polyalkylene ether polyol having an equivalent weight of at least about 200, a liquid fatty acid triglyceride having an hydroxyl number of at least 49, and liquid essentially linear saturated polyesters having terminal hydroxyl groups, said polyester being the reaction product of a dibasic acid and a dihydric alcohol, and uniformly distributed throughout said foam about 5% to 40% by weight of substantially minus 44 micron particles of an inorganic hydrophilic pigment, the particles of which are coated with about 1% to about 30% by weight of a water-soluble, film-forming high polymer containing a substantially linear continuous carbon atom chain along which are distributed numerous side chains containing polar hydrophilic groups, the pH of a 1% aqueous solution of said polymer being within the range of about 4 to about 9.

2. The composition of claim 1 in which said water-soluble, film-forming high polymer is polyvinyl pyrrolidone.

3. The composition of claim 1 in which said water-soluble, film-forming high polymer is selected from the group consisting of water-soluble homopolymers of an amide of an unsaturated carboxylic acid and water-soluble copolymers thereof.

4. The composition of claim 1 in which said water-soluble, film-forming high polymer is polyvinyl alcohol.

5. The composition of claim 1 in which said water-soluble, film-forming high polymer is polyvinyl ether.

6. An essentially open celled plastic foam composition comprising the water-foamed polymerization product of a liquid polyurethane prepolymer having free —NCO groups, said prepolymer being the reaction product of an arylene diisocyanate and a liquid polyalkylene ether polyol having an equivalent weight of at least 200, and uniformly distributed throughout said polymerization product about 5% to 40% by weight of substantially minus 44 microns particles of a siliceous mineral, the particles of which are coated with about 1% to 30% by weight of a water-soluble, film-forming high polymer containing a substantially linear continuous carbon atom chain along which are distributed numerous side chains containing polar hydrophilic groups, the pH of a 1% aqueous solution of said polymer being within the range of about 4 to about 9.

7. An essentially open celled plastic foam composition comprising the water-foamed polymerization product of a liquid polyurethane prepolymer having free —NCO groups, said prepolymer being the reaction product of an arylene diisocyanate and a liquid polyalkylene ether polyol having an equivalent weight of at least 200, and uniformly distributed throughout said polymerization product about 5% to 40% by weight of substantially minus 44 micron particles of a nonswelling clay, the particles of which are coated with about 1% to 30% by weight of a water-soluble, film-forming high polymer containing a substantially linear continuous carbon atom chain along which are distributed numerous side chains containing polar hydrophilic groups, the pH of a 1% aqueous solution of said polymer being within the range of about 4 to about 9.

8. An essentially open celled plastic foam composition comprising the water-foamed polymerization product of a liquid polyurethane prepolymer having free —NCO groups, said prepolymer being the reaction product of an arylene diisocyanate and at least one liquid polyol selected from the group consisting of a liquid long chain linear polyalkylene ether polyol having an equivalent weight of at least about 200, a liquid fatty acid triglyceride having an hydroxyl number of at least 49, and liquid essentially linear saturated polyesters having terminal hydroxyl groups, said polyester being the reaction product of a dibasic acid and a dihydric alcohol and uniformly distributed throughout said foam about 5% to 40% by weight of substantially minus 44 micron particles of attapulgite clay, the particles of which are coated with about 1% to about 30% by weight of a water-soluble, film-forming high polymer containing a substantially linear continuous carbon atom chain along which are distributed numerous side chains containing polar hydrophilic groups, the pH of a 1% aqueous solution of said polymer being within the range of about 4 to about 9.

9. An essentially open celled plastic foam composition comprising the water-foamed polymerization product of a liquid polyurethane prepolymer having free —NCO groups, said prepolymer being the reaction product of an arylene diisocyanate and a liquid polyalkylene ether polyol having an equivalent weight of at least 200, and uniformly distributed throughout said polymerization product about 5% to 40% by weight of substantially minus 44 micron particles of attapulgite clay, the particles of which are coated with about 1% to 30% by weight of a water-soluble, film-forming high polymer containing a substantially linear continuous carbon atom chain along which are distributed numerous side chains containing polar hydrophilic groups, the pH of a 1% aqueous solution of said polymer being within the range of about 4 to about 9.

10. The composition of claim 9 in which said film-forming polymer is polyvinylpyrrolidone.

11. The composition of claim 9 in which said film-forming polymer is polyacrylamide.

12. The composition of claim 9 in which said film-forming polymer is polyvinyl alcohol.

13. The composition of claim 9 in which said film-forming polymer is polyvinyl ether.

14. A composition comprising the essentially open celled plastic foam obtained by foaming with water in the presence of a tertiary amine catalyst, the prepolymer having free —NCO groups which is the reaction product of a liquid long chain linear polyalkylene ether polyol having an equivalent weight of at least 200 and an arylene diisocyanate, and uniformly distributed therethrough about 5% to 40% by weight of substantially minus 44 micron particles of attapulgite clay, the particles of which are coated with about 5% to 30% by weight of polyvinylpyrrolidone.

References Cited in the file of this patent

UNITED STATES PATENTS 2,591,884    Simon et al. _____ Apr. 8, 1952

UNITED STATES PATENT OFFICE
CERTIFICATE OF CORRECTION

Patent No. 3,024,209                                            March 6, 1962

Thomas H. Ferrigno

It is hereby certified that error appears in the above numbered patent requiring correction and that the said Letters Patent should read as corrected below.

Column 2, line 7, strike out "such,"; column 4, line 58, for "vonyl" read -- vinyl --; column 8, line 4, for "that" read -- than --.

Signed and sealed this 25th day of September 1962.

(SEAL)
Attest:

ERNEST W. SWIDER                                   DAVID L. LADD
Attesting Officer                                       Commissioner of Patents